US012056354B2

(12) United States Patent
Amdur et al.

(10) Patent No.: US 12,056,354 B2
(45) Date of Patent: Aug. 6, 2024

(54) COMMON VOLUME REPRESENTATION IN A VIRTUALIZED COMPUTING SYSTEM

(71) Applicant: VMware, Inc., Palo Alto, CA (US)

(72) Inventors: Matthew B. Amdur, Winchester, MA (US); Peng Dai, Acton, MA (US)

(73) Assignee: VMware LLC, Palo Alto, CA (US)

( * ) Notice: Subject to any disclaimer, the term of this patent is extended or adjusted under 35 U.S.C. 154(b) by 5 days.

(21) Appl. No.: 17/579,375

(22) Filed: Jan. 19, 2022

(65) Prior Publication Data

US 2023/0229305 A1 Jul. 20, 2023

(51) Int. Cl.
*G06F 3/06* (2006.01)
*G06F 9/455* (2018.01)

(52) U.S. Cl.
CPC .......... *G06F 3/0607* (2013.01); *G06F 3/0644* (2013.01); *G06F 3/0665* (2013.01); *G06F 3/0683* (2013.01); *G06F 9/45558* (2013.01); *G06F 2009/45583* (2013.01)

(58) Field of Classification Search
CPC ....... G06F 2009/45579; G06F 9/45533; G06F 11/0709; G06F 11/0757; G06F 12/10; G06F 2212/657; G06F 3/0604; G06F 3/0605; G06F 3/0644; G06F 3/0652; G06F 3/0659; G06F 3/0664; G06F 3/067; G06F 3/0673; G06F 9/45558; G06F 12/023; G06F 2009/4557
See application file for complete search history.

(56) References Cited

U.S. PATENT DOCUMENTS

| 2016/0188430 A1* | 6/2016 | Nitta ................... G06F 11/2094 714/6.3 |
| 2017/0300386 A1* | 10/2017 | Shulga ................ G06F 9/45558 |
| 2022/0035556 A1* | 2/2022 | Cashman ................ G06F 12/10 |

* cited by examiner

*Primary Examiner* — Yong J Choe
(74) *Attorney, Agent, or Firm* — Kim & Stewart LLP

(57) ABSTRACT

An example method of providing a common volume (cVol) datastore for virtual machines (VMs) managed by a hypervisor in a virtualized computing system is described. The method includes: mounting, by the hypervisor, a network file system share of a common volume (cVol), the cVol stored in shared storage of the virtualized computing system, the network file system share storing metadata for the VMs; creating a file system for the cVol datastore backed by the network file system share; routing file operations targeting the metadata to the file system for the cVol datastore; and routing file operations targeting virtual disks of the VMs to an object storage pool of the cVol based on descriptors in the metadata that point to objects backing the virtual disks.

17 Claims, 3 Drawing Sheets

COMMON VOLUME REPRESENTATION IN A VIRTUALIZED COMPUTING SYSTEM

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

In a virtualized computing system, VMs can interact with a storage subsystem through portable operating system interface (POSIX) file systems. POSIX file systems, however, lack the critical support for policy-based management at the granularity of a virtual disk. Object datastores can use a separate object for each set of VM configuration files, which leads to an inefficient, less scalable, and more complex solution in some environments. It is therefore desirable to provide an improved datastore implementation that overcomes these disadvantages.

DETAILED DESCRIPTION

Techniques for common volume representation in a virtualized computing system are described. In embodiments, a common volume (cVol) uses a network file system for virtual machine (VM) metadata and an object storage system for virtual disks. With the separation of metadata and data, cVol allows each to be scaled independently. The metadata file system seamlessly enables virtualization management workflows by fulfilling the datastore abstraction while the object storage system offers direct, scalable, and performant access to virtual disks under policy-based management. Compared to existing implementations, cVol eliminates shared storage requirements, increases cluster scalability by stretching the datastore across a greater number of hosts, and improves cost efficiency through namespace sharing. A common volume supports a variety of object storage systems in different endpoints, including native block storage in a cloud data center or federated storage in an on-premises data center, resulting in a unified system architecture and consistent user experience. These and further aspects of the techniques are described below with respect to the drawings.

Figure 1:
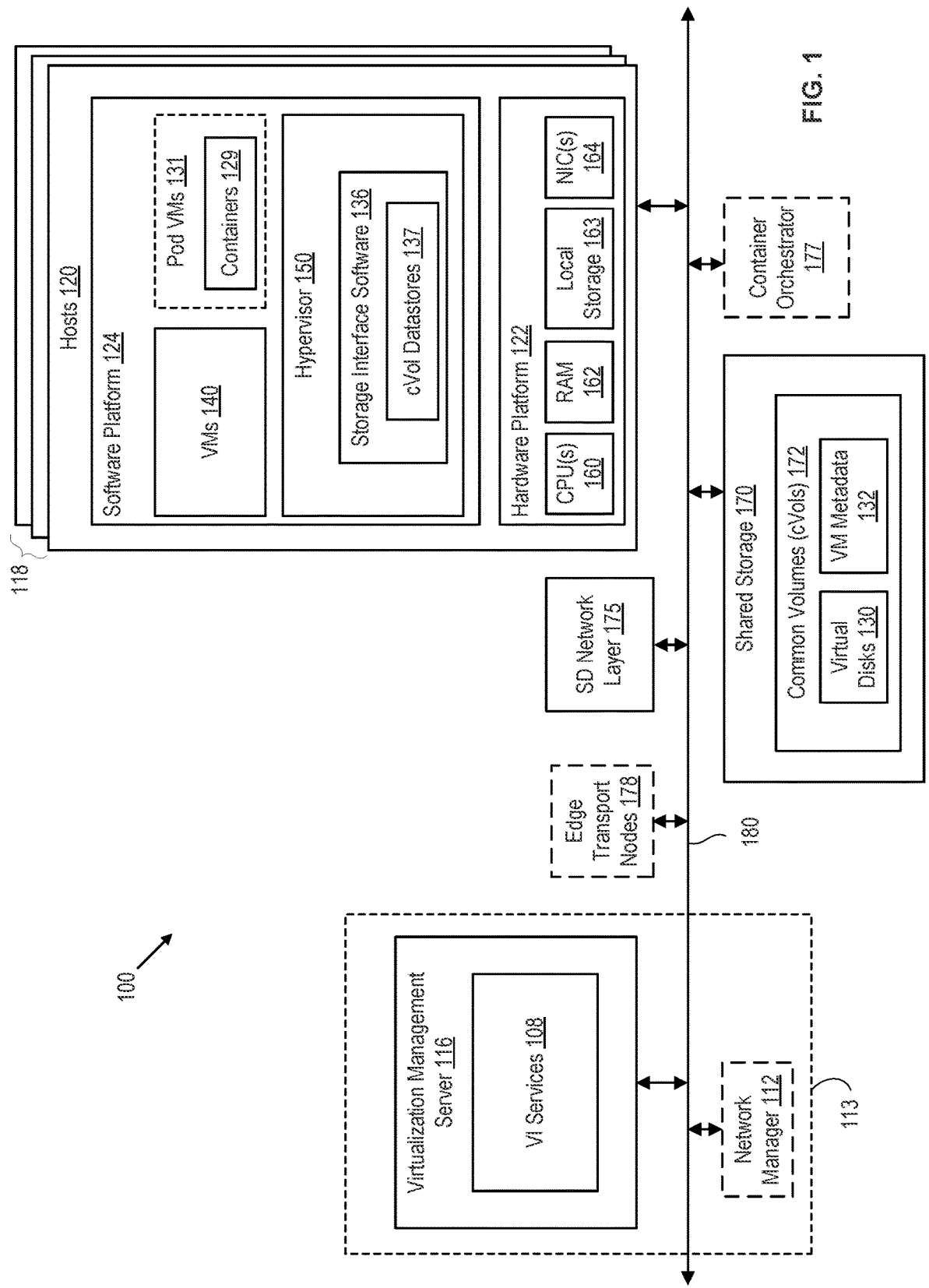
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein. While one physical network 180 is shown, in embodiments, virtualized computing system 100 can include multiple physical networks that are separate from each other (e.g., a separate physical network for storage).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170. Virtualization management server 116 can select which local storage devices in hosts 120 are part of a vSAN for host cluster 118.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

In embodiments, virtualization management server 116 is a physical or virtual server that manages host cluster 118 and the virtualization layer therein. Virtualization management server 116 can be deployed as VM(s) 140, containers (e.g., pod VM(s) 131 discussed below), or a combination thereof. Virtualization management server 116 installs agent(s) in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs, containers, or a combination thereof. Network manager 112 installs additional agents in hypervisor 150 to add a host 120 as a managed entity, referred to as a transport node. In this manner, host cluster 118 can be a cluster of transport nodes. One example of an SD networking platform that can be configured and used in embodiments described herein as network manager 112 and SD network layer 175 is a VMware NSX® platform made commercially available by VMware, Inc. of Palo Alto, CA.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like. A VI admin can interact with virtualization management server 116 through a VM management client. Through a VM management client, a VI admin commands virtualization management server 116 to form host cluster 118, configure resource pools, resource allocation policies, and other cluster-level functions, configure storage and networking, and the like.

In embodiments, workloads can also execute in containers 129. In embodiments, hypervisor 150 can support containers 129 executing directly thereon. In other embodiments, containers 129 are deployed in VMs 140 or in specialized VMs referred to as "pod VMs 131." A pod VM 131 is a VM that includes a kernel and container engine that supports execution of containers, as well as an agent (referred to as a pod VM agent) that cooperates with a controller executing in hypervisor 150. In embodiments, virtualized computing system 100 can include a container orchestrator 177. Container orchestrator 177 implements an orchestration control plane, such as Kubernetes®, to deploy and manage applications or services thereof in pods on hosts 120 using containers 129. Container orchestrator 177 can include one or more master servers configured to command and configure controllers in hypervisors 150. Master server(s) can be physical computers attached to network 180 or implemented by VMs 140/131 in a host cluster 118.

VMs 131/140 and hypervisor 150 consume and interact with shared storage 170 through a datastore abstraction. In embodiments, shared storage 170 stores common volumes (cVols) 172, which are instantiated on hosts 120 by storage interface software 136 as cVol datastores 137. VI services 108 in virtualization management server 116 can discover cVol datastores 137 as managed objects through host synchronization. In general, hypervisor 150 can support multiple types of datastores, such as virtual machine file system (VMFS) datastores, network file system (NFS) datastores, vSAN data stores, virtual volume (vVol) datastores, and cVol datastores 137. Each datastore offers durable and strongly consistent metadata and data access. Other than those common denominators, the datastores offer varying properties in terms of availability, policy, performance, and storage protocols used to access the data. Regardless of the type and implementation details, the datastore abstraction serves the following functionalities.

A datastore provides a VM catalog that supports create, update, and delete (CRUD) operations over a file system interface (e.g., a POSIX or POSIX-like interface) for VMs 131/140. A datastore provides a namespace for each VM that resides on the datastore either completely or partially (e.g., some virtual disks). The VM namespace serves as a container of VM metadata, such as virtual machine configuration files (e.g., vmx files), log files, disk descriptors, and the like. VM metadata are stored in files accessible through the file system interface. A datastore provides virtual disks for each VM either directly or indirectly. A datastore provides storage for infrastructure metadata that may be related to VMs but are not specific to any VM. A datastore provides locking to arbitrate access across multiple concurrent consumers. In some embodiments, a datastore can be used without a VM/container to store virtual disks (e.g., sometimes referred to as first class disks).

Some datastores, such as VMFS and NFS datastores, are backed by POSIX file systems. A VMFS datastore, for example, uses a cluster file system. An NFS datastore, for example, uses an industry standard NFS protocol head over local file systems. The datastore functionalities map directly to the POSIX semantics of the backing file systems. Specifically, each VM namespace is backed by a regular directory. The VM catalog is supported through a directory listing. Virtual disks are backed by regular files. Access arbitration is implemented using file locking. A disadvantage of these types of datastores is the lack of support for policy-based management at the granularity of a virtual disk. Policy serves as a contract between application and storage system. A contract defined in terms of application intent at the granularity of a virtual disk (e.g., the scope of storage consumption) can be critical to ensure the consistency of application behavior. The lack thereof obfuscates the application/storage interface, which makes it difficult to determine application behavior and to size the application. This is determined by the file-based implementation of virtual disks as files, which inherit the properties of the file system as a whole.

Object datastores, such as vSAN and vVol, aim to address the gap of file system-based datastores with object support. In an object datastore, virtual disks are backed by objects, the behavior of which can be individually controlled via defined policies. Unlike file-based datastores, an object datastore can be backed by a file system, such as the Object Store File System (OSFS). OSFS is a virtual file system that maps POSIX operations to the underlying storage systems. Specifically, each VM namespace is backed by its own POSIX file system. In the case of vSAN and block-based vVol, the datastores can use. VMFS (for example) on top of an individual object. In the case of NFS-based vVol, datastores can use an individual NFS share. VM metadata access and arbitration map to the POSIX semantics of the VM namespace file system. The VM catalog is implemented as a virtual directory with its content backed by storage systems and obtained by the host via out-of-band mechanisms, such as the cluster management, monitoring, and directory service (CMMDS) for vSAN and vStorage application programming interfaces (APIs) for Storage Awareness (VASA) for vVol. Virtual disks are backed by individual objects that are access through pointers (or descriptors) stored in regular files in the VM namespace file system.

Each cVol 172 also implements a datastore abstraction and stores virtual disks 130 and VM metadata 132. As described further below, each cVol 172 uses a network file system to host the namespaces of all VMs 140 as regular directories. Virtual disks 130, however, are backed by individual objects that are stored in a separate object storage pool and accessed via descriptors stored in the VM namespace. The lifecycle, access, and data services of an object are managed through an object storage control plane, the implementation of which is specific to the object storage pool in use (e.g., vSAN, vVol, or the like).

Figure 2:
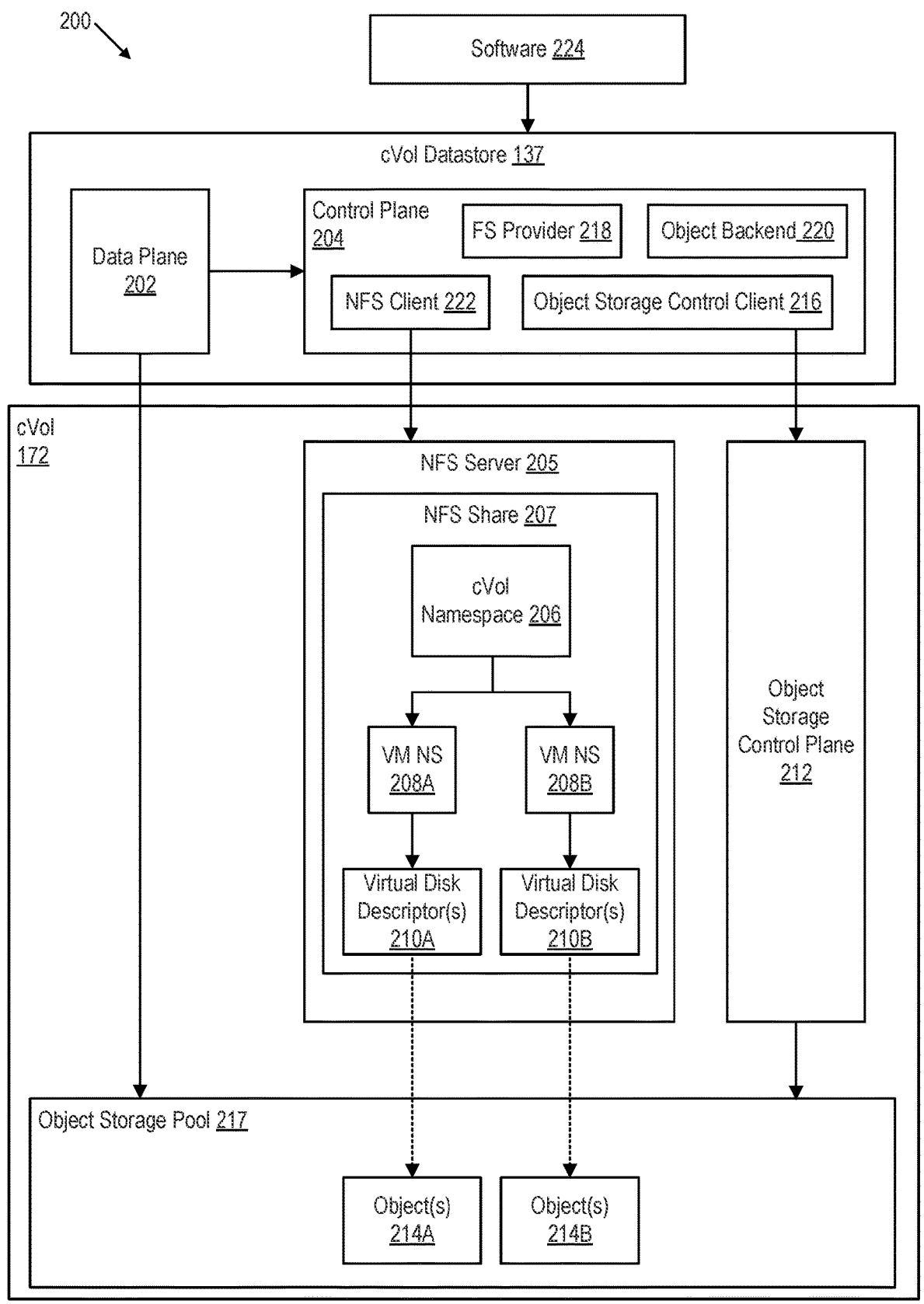
FIG. 2 is a block diagram depicting cVol architecture according to an embodiment.

FIG. 2 is a block diagram depicting cVol architecture 200 according to an embodiment. cVol datastore 137 in hypervisor 150 includes a data plane 202 and a control plane 204. Software 224 (e.g., executing in a VM 131/140) accesses a cVol 172 through cVol datastore 137 of storage interface software 136. Data plane 202 is configured to access virtual disks stored as objects in an object storage pool 217. Data plane 202 writes data to, and reads data from, the virtual disks on behalf of VMs 140. Control plane 204 is configured to manage VM namespaces, object policies, and the like. In embodiments, control plane 204 includes an object storage control client 216, a file system (FS) provider 218, object backend 220, and an NFS client 222. Object storage control client 216 interacts with control plane 204 for object lifecycle management. Object backend 220 plugs into the object abstraction in storage interface software 136. Storage interface software 136 can include other components, such as a file system daemon (FSD) and file system driver. The FSD can be an OSFS daemon (osfsd), for example, and is configured to receive operations from software 224, such as lookup and read directory operations, as well as CRUD operations for VM namespaces. The FSD performs the operations through system calls to the FS driver through FS provider 218. Data plane 202 relies on control plane 204 for locking.

The FS driver (e.g., an OSFS driver) implements cVol datastore 137 as a file system (e.g., OSFS) referred to as an FS container (e.g., OSFS container) having the type cVol ("cVol FS container"). The cVol FS container is backed by an NFS share 207 managed by an NFS server 205. NFS share 207 stores VM metadata 132 of a cVol 172. FS provider 218 is configured to manage the mapping between a cVol datastore 137 and NFS share 207. FS provider 218 routes file system requests targeting cVol datastore 137 to NFS server 205 through NFS client 222. In embodiments, NFS share 207 is invisible to software 224. NFS server 205 can be a physical server or a VM.

Each cVol 172 stores VM metadata in a cVol namespace 206 on NFS share 207, which includes separate VM namespaces for each VM 140 (e.g., VM namespace (NS) 208A and VM NS 208B for two different VMs 140). Each VM NS 208A and 208B is a separate directory in NFS share 207 and includes files for storing VM metadata 132. NFS share 207 can include a separate directory (not shown) for storing infrastructure metadata (if present). NFS share 207 does not store virtual disks 130 for VMs 140. Rather, virtual disks 130 are backed by objects in object storage pool 217. Each VM namespace includes virtual disk descriptors that include information for identifying objects in object storage pool that back virtual disks 130 (e.g., virtual disk descriptors 210A in VM NS 208A and virtual disk descriptors 210B in VM NS 208B). Virtual disk descriptors 210A point to objects 214A in object storage pool 217 (e.g., virtual disks for the VM in VM NS 208A). Virtual disk descriptors 210B point to objects 214B in object storage pool 217 (e.g., virtual disks for the VM in VM NS 208B). As such, virtual disks 130 are stored and managed as objects in object storage pool 217.

Control plane 204 manages virtual disks through an object storage control plane 212. Object storage control plane 212 performs CRUD operations for objects in object storage pool 217.

The network file system used to store VM metadata should not be confused with the NFS protocol. As long as it offers POSIX semantics and meets the consistency, availability, and scalability requirements, any network file system implementation can be used, including NFS.

Compared to file-based datastores and object datastores, cVols offer a number of unique benefits. Object datastores use a separate file system for each VM namespace. A cVol is more efficient and scalable. Specifically, a VM namespace typically has a small storage footprint in terms of capacity and input/output operations per second (IOPS) usage. Object datastores typically over-provision storage for each VM namespace to avoid running out of resources. For example, a VM namespace on a vSAN datastore can have a 256 GB nominal capacity. When thin provisioning is not an option, such as in a cloud, the provisioned size of VM namespaces can lead to significant cost inflation. A cVol provides a single NFS share that stores each VM namespace, which can be more efficiently provisioned and scaled depending on the number of VM namespaces. For cVols, the VM catalog is implemented as a directory listing over NFS without the need for a separate out-of-band mechanism. Further, VM namespace sharing in a cVol reduces the number of objects and/or protocol endpoints needed, leading to a more scalable solution.

Compared to object datastores that use a file system (e.g., VMFS) for VM namespaces, cVol is more scalable and portable. Specifically, as a symmetric clustered file system, the size of a VMFS cluster (e.g., the number of hosts that can concurrently mount the same file system) is limited to a certain number of hosts (e.g., 64 hosts). Due to architectural differences, NFS is not subject to the same scalability limit. With proper sizing of the NFS share for mostly VM metadata workload, a cVol datastore backed by NFS can be mounted across a larger number of hosts and clusters for increased reach. Moreover, VMFS imposes shared storage requirements that are not always met. By eliminating these requirements, NFS lowers the barrier of entry, reduces overall complexity, and increases portability across different environments.

Figure 3:
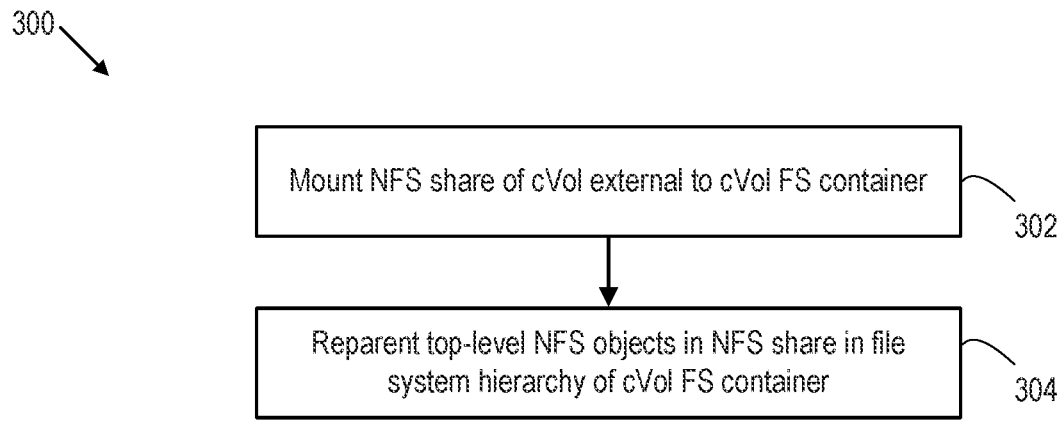
FIG. 3 is a flow diagram depicting a method of mapping an NFS share of a cVol to the file system of a cVol datastore according to an embodiment.

FIG. 3 is a flow diagram depicting a method 300 of mapping an NFS share of a cVol to the file system of a cVol datastore according to an embodiment. Method 300 begins at step 302, where NFS client 222 mounts NFS share 207 external to the cVol FS container provided by FS driver 220 for cVol datastore 137. NFS share 207 is not directly accessible by software 224 targeting cVol datastore 137. At step 304, FS provider 218 reparents the top-level NFS objects in NFS share 207 into the file system hierarchy of the cVol FS container for cVol datastore 137. In embodiments, VM namespaces in NFS share 207 become directories in the file system hierarchy of the cVol FS container. To software 224, it is as if the VM namespaces are physically located in the cVol FS container.

Figure 4:
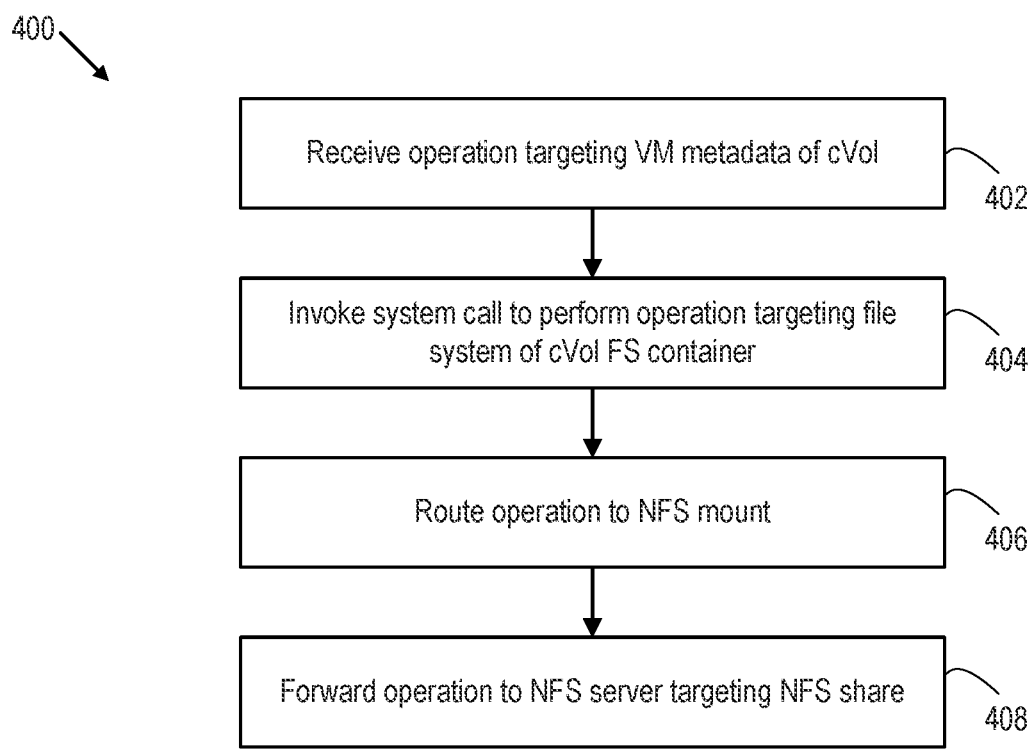
FIG. 4 is a flow diagram depicting a method of accessing VM metadata of a cVol according to an embodiment.

FIG. 4 is a flow diagram depicting a method 400 of accessing VM metadata of a cVol according to an embodiment. Method 400 begins at step 402, where control plane 204 receives an operation targeting VM metadata of a cVol from software 224. At step 404, control plane 204 invokes a system call through FS provider 218 to perform the operation targeting the file system of the cVol FS container of cVol datastore 137. At step 406, control plane 204 routes the operation to the NFS mount for NFS share 207. At step 408, NFS client 222 forwards the operation to NFS server 205 targeting NFS share 207.

In addition to the datastore abstraction, cVol must support the object abstraction, which includes of a set of interfaces for object identity and lifecycle management. In embodiments, an object in cVol is identified and located via a uniform resource identifier (URI) in the format of <DS-TYPE>://<CONTAINER-ID>/<PROVIDERID>:<OBJECT-ID>, where DS-TYPE indicates the type of the datastore, CONTAINER-ID identifies the datastore instance, PROVIDER-ID identifies the object storage provider, and OBJECT-ID identifies the object instance within the provider. The URI is stored in a descriptor file in the VM namespace (e.g., virtual disk descriptors 210A/210B). While the details on how objects of a specific object storage provider are supported is out of scope, it is important to note that cVol provides a generic way to manage object storage providers with disparate technologies and implementations, including vSAN and vVol.

In cVol, metadata is stored in NFS share while data is stored separately in objects. The separation of data from metadata enables one to be scaled independently of the other. Compared to traditional NFS datastore, the workload targeting the NFS mount backing such a datastore is metadata centric. The intensity of the metadata workload is directly related to the VM ops. By varying VM ops, we can observe the impact on the NFS share, which can be used to size and scale the NFS server. In addition to the scalability implications, the separation of data from metadata also introduces subtle differences to VM storage availability semantics. A VM on NFS backed object datastore maintains storage availability if and only if it retains access to both the shared NFS namespace and its objects. In contrast, for VMs on regular NFS datastore, VM storage availability is typically that of the NFS datastore itself; for VMs on vSAN and vVol datastores, each has a dedicated VM namespace object, which affects VM storage availability. When the namespace goes down in an NFS backed object datastore, it has a blast radius of all VMs on the datastore. This makes the NFS availability all the more important, just like a regular NFS datastore. While vSAN and vVol have smaller blast radius with the use of dedicated namespace, it may not lead to significant availability improvement in reality due to failure correlation and lack of placement groups.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of providing a common volume (cVol) datastore for virtual machines (VMs) managed by a hypervisor in a virtualized computing system, the method comprising:
  mounting, by the hypervisor, a network file system (NFS) share of a common volume (cVol), the cVol stored in shared storage of the virtualized computing system, the network file system share storing metadata for the VMs;
  creating a file system for the cVol datastore, the network file system share mounted external to the file system for the cVol datastore wherein directories of the NFS share are reparented in the file system for the cVol;
  routing file operations targeting the metadata to the file system for the cVol datastore; and
  routing file operations targeting virtual disks of the VMs to an object storage pool of the cVol based on descriptors in the metadata that point to objects backing the virtual disks.

2. The method of claim 1, wherein each of the directories stores a portion of the metadata for a namespace of a respective one of the VMs.

3. The method of claim 2, wherein each of the directories stores one or more descriptors pointing to one or more objects backing one or more virtual disks attached to a respective one of the VMs.

4. The method of claim 3, wherein the file operations targeting the virtual disks are routed to the object storage pool by a data plane of storage interface software in the hypervisor.

5. The method of claim 4, wherein the file operations targeting the metadata are routed to the file system for the cVol datastore by a control plane of the storage interface software.

6. The method of claim 5, wherein the control plane is configured to manage the objects in the object storage pool through an object storage control plane.

7. A non-transitory computer readable medium comprising instructions to be executed in a computing device to cause the computing device to carry out a method of providing a common volume (cVol) datastore for virtual machines (VMs) managed by a hypervisor in a virtualized computing system, the method comprising:
  mounting, by the hypervisor, a network file system (NFS) share of a common volume (cVol), the cVol stored in shared storage of the virtualized computing system, the network file system share storing metadata for the VMs;
  creating a file system for the cVol datastore, the network file system share mounted external to the file system for the cVol datastore, wherein directories of the NFS share are reparented in the file system for the cVol;
  routing file operations targeting the metadata to the file system for the cVol datastore; and
  routing file operations targeting virtual disks of the VMs to an object storage pool of the cVol based on descriptors in the metadata that point to objects backing the virtual disks.

8. The non-transitory computer readable medium of claim 7, wherein each of the directories stores a portion of the metadata for a namespace of a respective one of the VMs.

9. The non-transitory computer readable medium of claim 8, wherein each of the directories stores one or more descriptors pointing to one or more objects backing one or more virtual disks attached to a respective one of the VMs.

10. The non-transitory computer readable medium of claim 9, wherein the file operations targeting the virtual disks are routed to the object storage pool by a data plane of storage interface software in the hypervisor.

11. The non-transitory computer readable medium of claim 10, wherein the file operations targeting the metadata are routed to the file system for the cVol datastore by a control plane of the storage interface software.

12. The non-transitory computer readable medium of claim 11, wherein the control plane is configured to manage the objects in the object storage pool through an object storage control plane.

13. A virtualized computing system, comprising:
  a hardware platform; and
  a hypervisor executing on the hardware platform supporting virtual machines (VMs), the hypervisor configured to provide a common volume (cVol) datastore for the VMs by:
    mounting, by the hypervisor, a network file system (NFS) share of a common volume (cVol), the cVol stored in shared storage of the virtualized computing system, the network file system share storing metadata for the VMs;
    creating a file system for the cVol datastore, the network file system share mounted external to the file system for the cVol datastore, wherein directories of the NFS share are reparented in the file system for the cVol;
    routing file operations targeting the metadata to the file system for the cVol datastore; and
    routing file operations targeting virtual disks of the VMs to an object storage pool of the cVol based on descriptors in the metadata that point to objects backing the virtual disks.

14. The virtualized computing system of claim 13, wherein each of the directories stores a portion of the metadata for a namespace of a respective one of the VMs.

15. The virtualized computing system of claim 14, wherein each of the directories stores one or more descriptors pointing to one or more objects backing one or more virtual disks attached to a respective one of the VMs.

16. The virtualized computing system of claim 13, wherein the file operations targeting the virtual disks are routed to the object storage pool by a data plane of storage interface software in the hypervisor.

17. The virtualized computing system of claim 16, wherein the file operations targeting the metadata are routed to the file system for the cVol datastore by a control plane of the storage interface software.

* * * * *